United States Patent
Tsukada

(10) Patent No.: US 7,012,750 B2
(45) Date of Patent: Mar. 14, 2006

(54) AUXILIARY LIGHT PROJECTION APPARATUS FOR AUTO FOCUS DETECTION

(75) Inventor: Shinichi Tsukada, Toride (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/448,198

(22) Filed: May 30, 2003

(65) Prior Publication Data

US 2003/0227685 A1    Dec. 11, 2003

(30) Foreign Application Priority Data

Jun. 6, 2002    (JP) .............................. 2002-165895

(51) Int. Cl.
    *G02B 5/18*    (2006.01)
(52) U.S. Cl. ...................... 359/569; 359/741; 359/619; 396/150
(58) Field of Classification Search ................ 359/569, 359/566, 574, 565; 396/111, 113, 150, 151
    See application file for complete search history.

(56) References Cited

U.S. PATENT DOCUMENTS 4,629,324 A * 12/1986 Stern .......................... 356/609
6,033,094 A *  3/2000 Sohn .......................... 362/332

\* cited by examiner

*Primary Examiner*—Thong Nguyen
*Assistant Examiner*—Arnel C. Lavarias
(74) *Attorney, Agent, or Firm*—Miles & Stockbridge P.C.

(57) ABSTRACT

An auxiliary light projection apparatus used for focus detection has a laser beam generating device and a diffraction plate for diffracting a laser light from said laser beam generating device. The diffraction plate has micro lenses regularly arranged in vertical and horizontal directions. The curvature of each micro lens in the vertical direction is different from that in the horizontal direction. The pitch of arrangement of the micro lenses in the vertical direction is different from that in the horizontal direction. In addition, the height of the micro lenses is varied cyclically. The auxiliary light projection apparatus projects a diffraction light pattern of the laser light emergent from the diffraction plate to an object to be photographed, as a pattern used for focus detection.

3 Claims, 5 Drawing Sheets

AUXILIARY LIGHT PROJECTION APPARATUS FOR AUTO FOCUS DETECTION

This application claims the benefit of Japanese Patent application No. 2002-165895 which is hereby incorporated by reference.

BACKGROUND OF THE INVENTION

1. Field of the Invention

The present invention relates to an apparatus for projecting auxiliary light for auto focus detection.

2. Related Background Art

A conventional auxiliary light projection apparatus used for assisting auto focus detection for photographing with a camera projects a slit-like stripe pattern to an object to be photographed, when the luminance of the object is low or the contrast of the object is low, in order for the camera to detect that pattern to effect auto focus detection. Recently, with progress in digital cameras, the area detected for auto focus detection has been enlarged. In view of this, a focus detection pattern (i.e. a pattern projected for assisting focus detection) that enables auto focus detection in an enlarged area has been used in the auxiliary light projection apparatus, which focus detection pattern is formed by dividing light from a stripe pattern previously provided and projecting the resultant pattern images.

On the other hand, it is well known that when a diffraction plate having micro lenses of the same shape periodically arranged in vertical and horizontal directions (i.e. two orthogonal directions) is irradiated with a laser beam, a diffraction pattern including discrete spots at diffraction angles proportional to the reciprocal number of the pitch of the micro lens arrangement is formed. This diffraction pattern has been also used as a pattern for focus detection recently.

However, in the former auxiliary light projection apparatus, the light quantity of projected light is decreased due to the presence of a film pattern disposed in front of a light source, and therefore it suffers from a problem that the projection distance to an object to be photographed is shortened. In addition, if the number of pattern division is substantially increased with the intention to cope with an enlarged focus detection area, the light quantity of patterns on an object to be photographed becomes low. Therefore, it would be sometimes necessary to use multiple LEDs for a light source, or to increase the power supplied to an LED. This also invites problems in terms of cost and duration of battery life.

On the other hand, auxiliary light projection apparatus using the latter principle suffer from another problem. That is, many auto focus detection apparatus used in single lens reflex cameras use one-dimensional line sensors, and such an auto focus detection apparatus cannot perform satisfactory focus detection with a discrete spot pattern provided by the latter auxiliary light projection apparatus.

SUMMARY OF THE INVENTION

The present invention has been made in view of the above-described problems. An object of the present invention is to provide an auxiliary light projection apparatus that projects a focus detection pattern having high contrast, to an object to be photographed.

In order to attain the above object, according to the present invention, there is provided an auxiliary light projection apparatus having a laser beam generating device and a diffraction plate for diffracting a laser light from the laser beam generating device, wherein the diffraction plate has micro lenses regularly arranged in vertical and horizontal directions, a curvature of each micro lens in the vertical direction is different from that in the horizontal direction, a pitch of arrangement of the micro lenses in the vertical direction is different from that in the horizontal direction, the height of the micro lenses is varied cyclically, and wherein the auxiliary light projection apparatus projects a diffraction light pattern of the laser light emergent from the diffraction plate to an object to be photographed, as a pattern used for focus detection.

In the auxiliary light projection apparatus according to the present invention, it is desirable that the focus detection pattern is formed in such a way that the diffraction light pattern includes a pattern that can be regarded as a bright line pattern extending in at least one of the vertical and horizontal directions.

DETAILED DESCRIPTION OF THE PREFERRED EMBODIMENT

In the following, an embodiment of the present invention will be described with reference to the annexed drawings.

Figure 1:
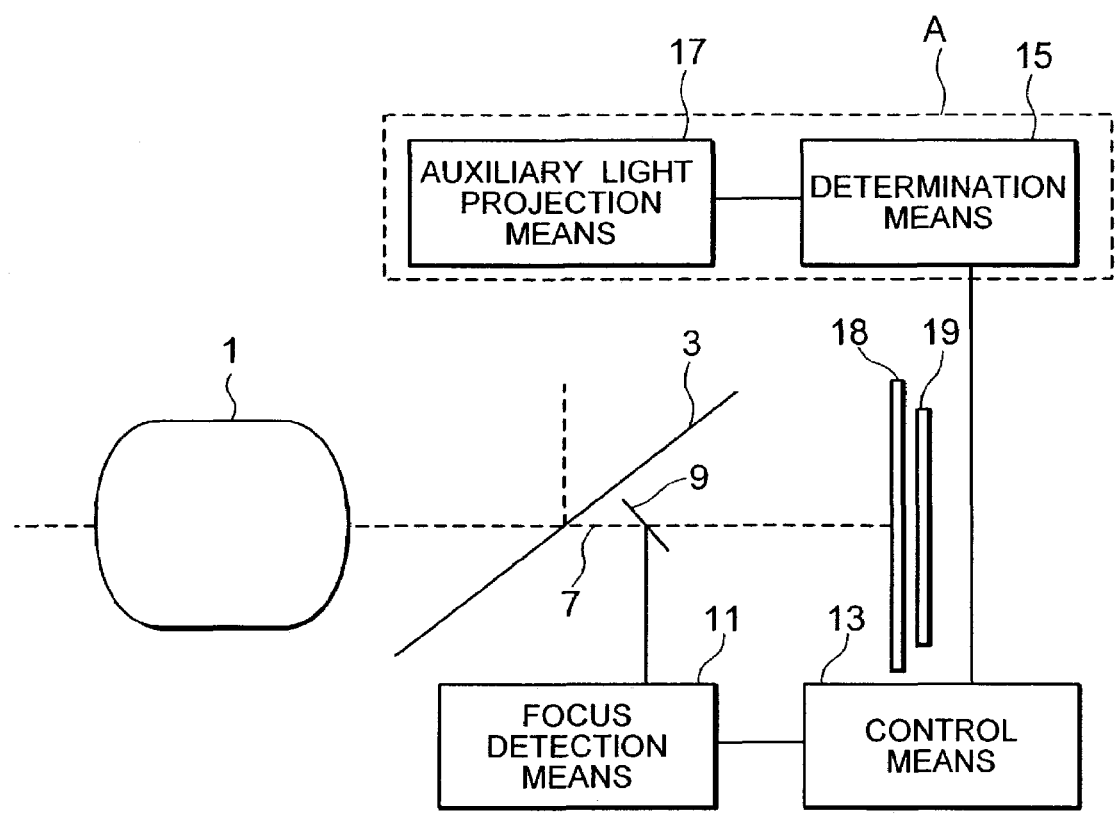
FIG. 1 is a diagram showing the outline of an auxiliary light projection apparatus according to the present invention that is mounted in an autofocus camera.
Figure 2:
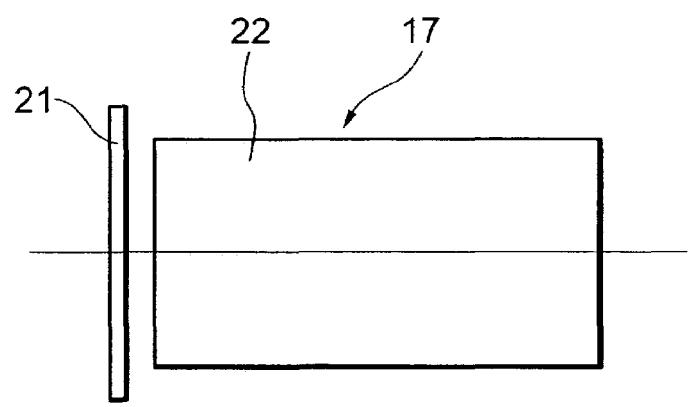
FIG. 2 is a diagram schematically showing a projection optical system of the auxiliary light projection apparatus according to one embodiment of the present invention.
Figure 3:
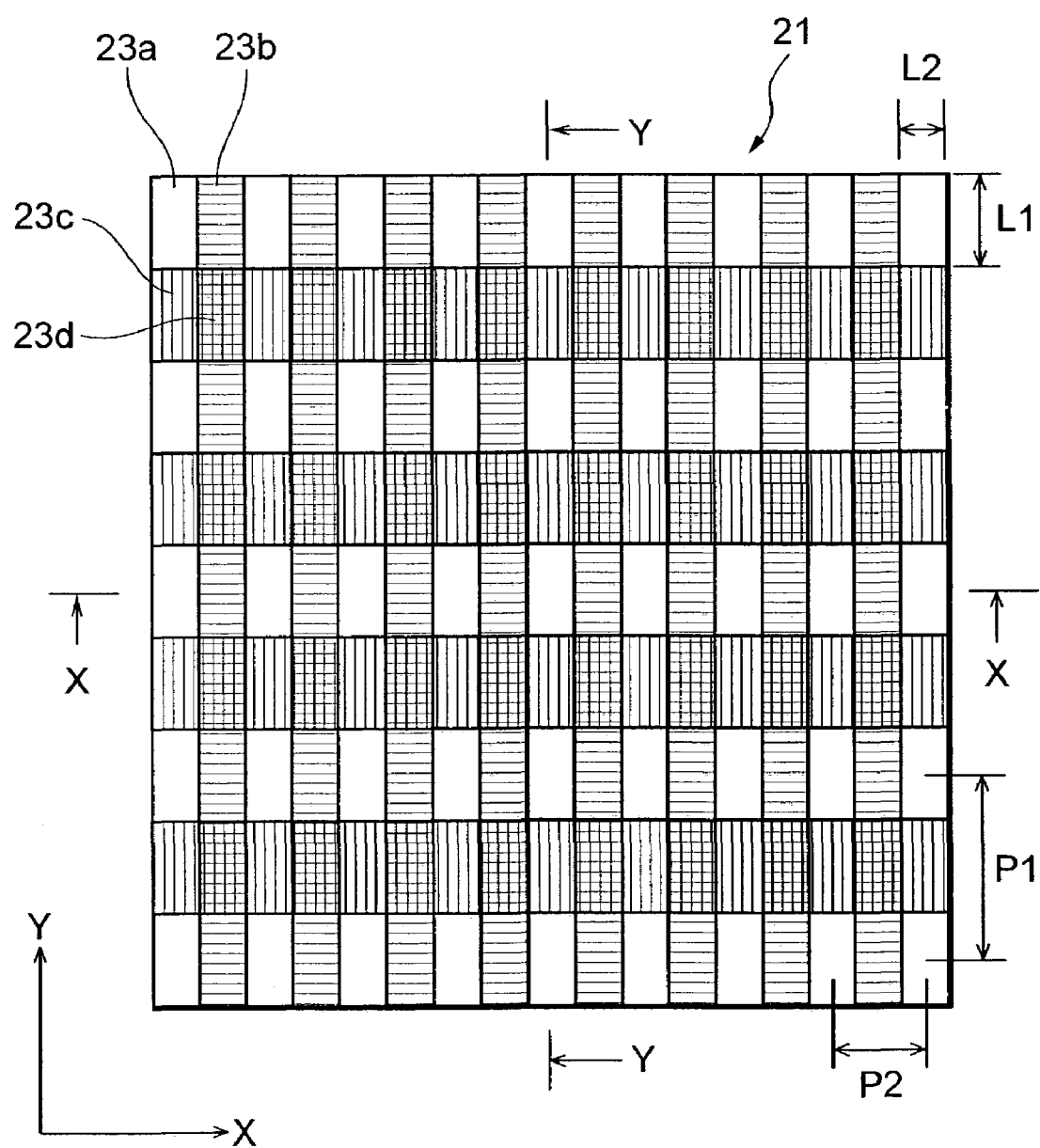
FIG. 3 is a diagram schematically showing a surface of a diffraction plate used in the above-mentioned embodiment of the present invention.
Figure 4:
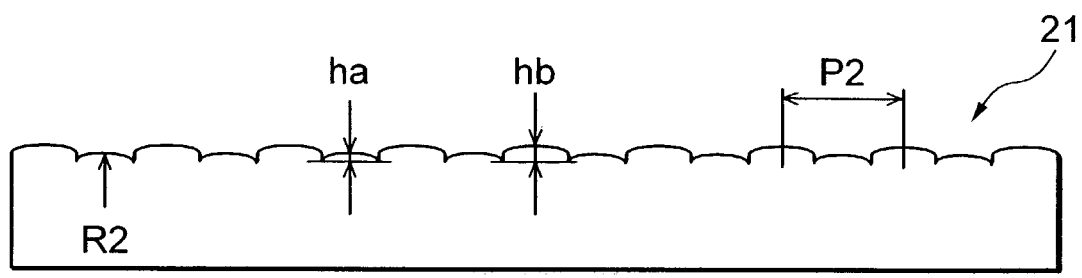
FIG. 4 is a cross sectional view taken on line X—X in FIG. 3, schematically showing the shape of the diffraction plate in that cross section.
Figure 5:
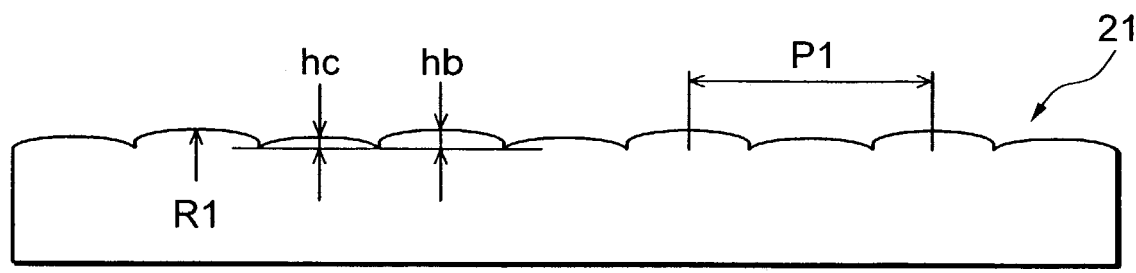
FIG. 5 is a cross sectional view taken on line Y—Y in FIG. 3, schematically showing the shape of the diffraction plate in that cross section.
Figure 6:
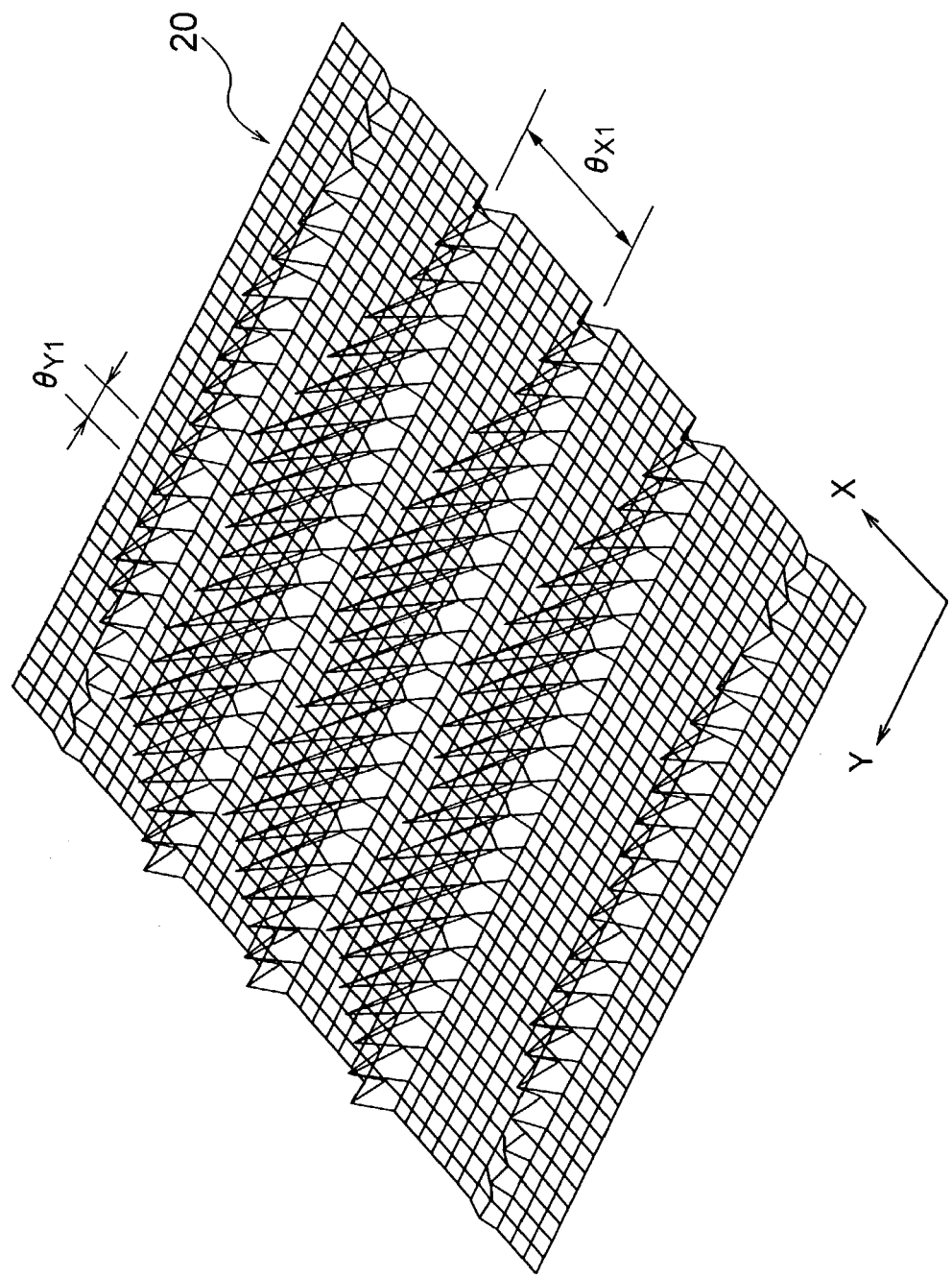
FIG. 6 is a diagram showing a diffraction light pattern obtained by calculation for the diffraction plate according to the embodiment of the present invention.
Figure 7:
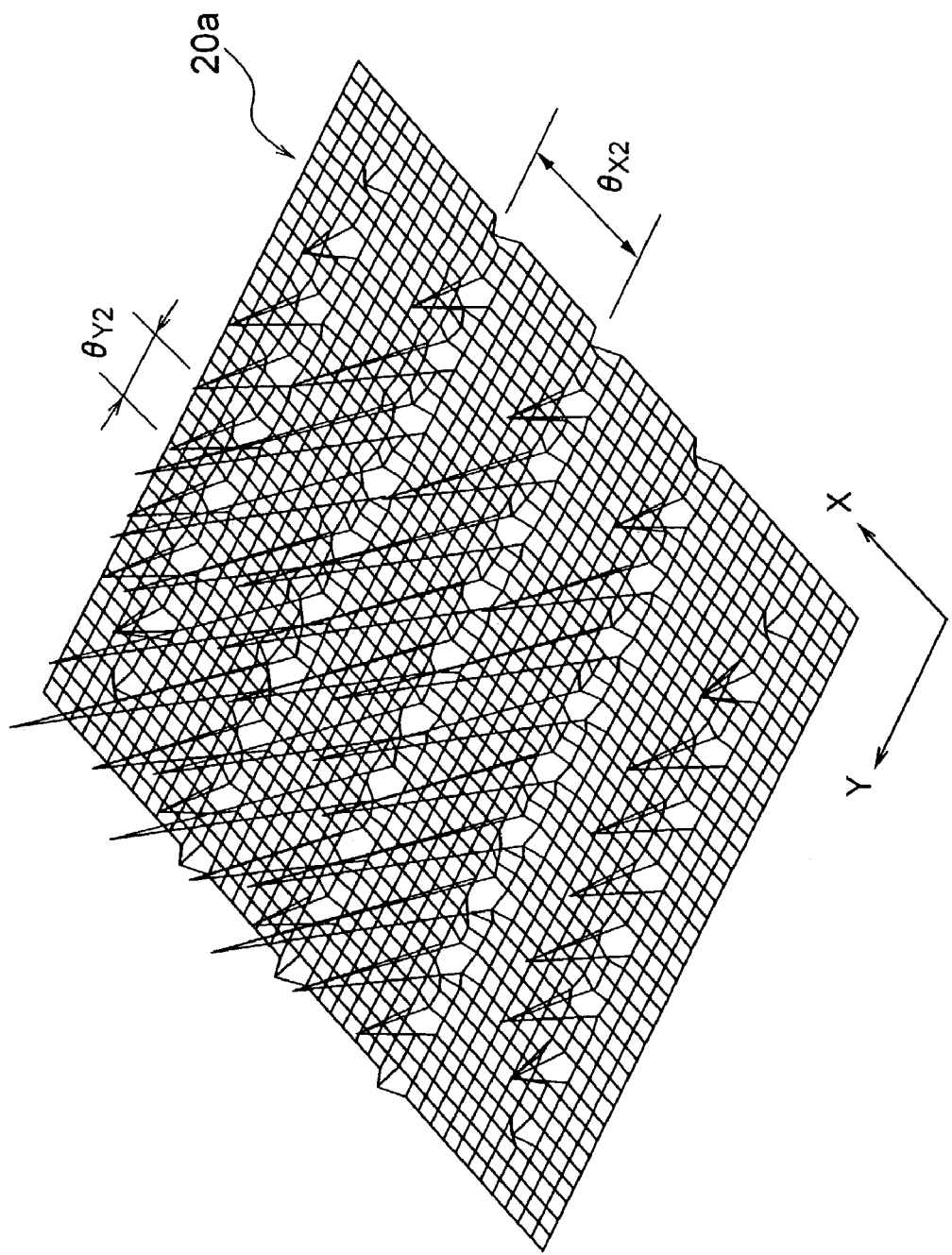
FIG. 7 is a diagram showing a diffraction light pattern obtained by calculation for an example of a diffraction plate in which the height of micro lenses is not varied, which is presented for reference.

FIG. 1 is a diagram showing the outline of an auxiliary light projection apparatus according to the present invention that is mounted in an autofocus camera. FIG. 2 is a diagram schematically showing a projection optical system of the auxiliary light projection apparatus according to one embodiment of the present invention. FIG. 3 is a diagram schematically showing a surface of a diffraction plate used in the above-mentioned embodiment of the present invention. FIG. 4 is a cross sectional view taken on line X—X in FIG. 3, schematically showing the shape of the diffraction plate in that cross section. FIG. 5 is a cross sectional view taken on line Y—Y in FIG. 3, schematically showing the shape of the diffraction plate in that cross section. FIG. 6 is a diagram showing a diffraction light pattern obtained by calculation for the diffraction plate according to the embodiment of the present invention. FIG. 7 is a diagram showing a diffraction light pattern obtained by calculation for an example of a diffraction plate in which the heights of micro lenses are not varied, which is presented for reference.

In FIG. 1, object field light is incident on a photographing lens 1 and then on a main mirror 3 so as to be divided into light to be delivered to a finder system (not shown) and light used in a focus detection system 7. After passing through the main mirror 3, the light beam having entered the focus detection system 7 is reflected by a sub-mirror 9 and incident on focus detection means 11. Thus, the light is used for distance measurement for auto focusing, and luminance or contrast of an object to be photographed is also detected based on the light from the object. In the auto focusing process, defocus with respect to an object to be photographed is detected by focus detection means 11, and a lens driving device (not shown) is controlled by control means 13, so that focus adjustment is performed to bring the photographing lens 1 in-focus.

On the other hand, luminance information or contrast information derived from the incident light is sent from the control means 13 to determination means 15. When it is determined by the determination means 15 that the luminance or contrast of the object to be photographed is low, auxiliary light of a focus detection pattern 20 shown in FIG. 6 is projected onto the object to be photographed from auxiliary light projection means 17. The projected light of the focus detection pattern 20 is reflected by the object and received by the focus detection means 11 via the photographing lens 1, the main mirror 3 and the sub-mirror 9, so that focus detection is effected. After the in-focus point is detected, the main mirror is lifted up and shutter 18 is actuated, so that an image of the object to be photographed is formed on a film or a CCD 19. An autofocus camera having the auxiliary light projection apparatus A is constructed as per the above.

The auxiliary light projection apparatus A may be either built in an autofocus camera or provided externally of an autofocus camera. In the latter case, the auxiliary light projection apparatus may be made integral with an external flash, for example.

When the control means has a function equivalent to that of the determination means 15, the determination means 15 may be omitted.

As shown in FIG. 2, the auxiliary light projection means 17 is composed of a diffraction plate 21 and a laser beam generating device 22. The diffraction plate 21 is disposed on the object side of the laser beam generating device 22. A laser light emitted from the laser beam generating device 22 is made incident on the diffraction plate 21 perpendicularly. The incident light is diffracted by the diffraction plate 21, so that its diffraction light pattern is projected to an object to be photographed (not shown).

The laser beam generating device 22 may have an optical element such as a beam expander to irradiate a sufficiently large area on the diffraction plate 21 with a laser light.

In the following, the diffraction plate according to the embodiment of the present invention will be specifically described with reference to FIGS. 3 to 5. The diffraction plate 21 is formed by regularly or periodically arranging micro lenses 23a, 23b, 23c and 23d in the vertical direction (i.e. the direction of Y-axis) and the horizontal direction (i.e. the direction of X-axis) in FIG. 3. Each of the micro lenses 23a, 23b, 23c and 23d is of rectangular shape having a vertical length L1 of 40 $\mu$m and a horizontal length L2 of 20 $\mu$m. The micro lenses 23a, 23b, 23c and 23d are arranged in the vertical and horizontal directions at respective pitches, which will be described later. The surface of each of the micro lenses 23a, 23b, 23c and 23d is formed as a curved surface having a radius of curvature R1 with respect to the vertical direction of 140 $\mu$m and a radius of curvature R2 with respect to the horizontal direction of 90 $\mu$m. The heights of the micro lenses 23a to 23d satisfy the following conditions, which are formulated with the height of the non-hatched portion (white portion) 23a being taken as the reference:

height of portion with no hatch pattern 23a:
  ha (reference height), height of portion with a vertical line hatch pattern 23b:

$$hb = ha \cdot 0.5 \cdot \lambda/(n-1),$$

height of portion with a horizontal line hatch pattern 23c:

$$hc = ha \cdot 1.0 \cdot \lambda/(n-1), \text{ and}$$

height of portion with a crossing line hatch pattern 23d:

$$hd = ha \cdot 1.5 \cdot \lambda/(n-1),$$

where $\lambda$ represents the wavelength of the laser light, n represents a refractive index of the diffraction plate for the laser light of that wavelength.

In the diffraction plate 21, the micro lenses of each of the micro lens groups 23a to 23d are arranged regularly in the vertical and horizontal directions at a pitch in the vertical direction P1 of 80 $\mu$m and a pitch in the horizontal direction P2 of 40 $\mu$m.

A diffraction light pattern that would be generated when a laser light emitted from the laser beam generating device 22 is made incident on the diffraction plate 21 shown in FIG. 3 was obtained by calculation, and the result of the calculation is shown in FIG. 6 using a coordinate system representing angles. In the calculation, it was assumed that the wavelength of the laser beam $\lambda = 0.7$ $\mu$m and the refractive index of the diffraction plate n=1.5, and the calculation was effected in the angle range in the vertical direction within $\pm 5°$ and the angle range in the horizontal direction within $\pm 5°$. The illustration in FIG. 6 is also limited to those angle ranges. The calculation result shows that the horizontal pitch $\theta x1$ of the spots in the diffraction light pattern is about 2° and the vertical pitch $\theta y1$ of the spots in the diffraction light pattern is about 0.5°.

As will be seen from FIG. 6, the spot pitch of the diffraction light pattern in the vertical direction is so small that the discrete spot pattern in the vertical direction of the diffraction light pattern can be actually regarded as bright lines that are continuously illuminated. This is because the spot pitch of the diffraction light pattern is so small that non-illuminated portion does not remain between the spots and a continuous illuminated portion is formed. The diffraction light pattern thus formed in the form of the stripe-like pattern including multiple bright lines is suitable for a focus detection pattern for use with an auto focus detection apparatus using a line sensor.

For comparative reference, FIG. 7 shows a result of the calculation similar to FIG. 6 that was performed on a diffraction plate in which the height of the micro lenses 23a to 23d is not varied. In this calculation, the height of the micro lenses is assumed to be the reference height ha and the wavelength $\lambda$ of the laser beam, the refractive index n of the diffraction plate 21, and other shape factors are assumed to be the same as those of the diffraction plate shown in FIG. 3.

As will be seen from FIG. 7, the spot pitch $\theta y2$ in the vertical direction of the diffraction light pattern is about 1°, which is the double of $\theta y1$. This is because the pitches of the arrangement of the micro lenses 23a to 23d in this comparative example are half the pitches of the arrangement of the micro lenses 23a to 23d in the diffraction plate shown in FIG. 3. Specifically, when the height of the micro lenses 23a to 23d is varied, their pitches are: the vertical pitch P1=80 μm and the horizontal pitch P2=40 μm, while when the height of the micro lenses 23a to 23d is the same (or constant), their pitches are: the vertical pitch P1=40 μm and the horizontal pitch P2=20 μm. In addition, the above-mentioned enlargement of the spot pitches reflects the fact that the diffraction angle θ of a diffraction light pattern is represented as θ=λ/P, namely, the diffraction angle θ is proportional to the wavelength λ and inversely proportional to the pitch P (i.e. P1 and P2).

In the case in which the pitch or the distance of the spots is enlarged as above, the spots in the diffraction light pattern become discrete, and there are portions that are not illuminated by light between the spots. Therefore, the spots cannot be regarded actually as a bright line in the vertical direction any more, and therefore, they are not suitable as a focus detection pattern for an auto focus detection apparatus using a line sensor any more.

As per the above, in the auxiliary light projection apparatus according to the present invention, the shape of the micro lenses is designed in the above-described manner, so that the diffraction light pattern actually includes bright lines extending in the vertical direction. Therefore, it is possible to form a high contrast focus detection pattern that is suitable for an auto focus detection device using a line sensor and to project it to an object to be photographed.

The specific structure of the micro lenses of the diffraction plate described in the foregoing as the embodiment was presented merely by way of example. Even if the wavelength of the laser beam or source light is varied, the same operations and advantageous effects can be realized by adjusting parameters of the micro lenses appropriately in accordance with the wavelength. In addition, it is possible to realize other diffraction light patterns by changing parameters of the micro lenses such as their arrangement pitches or curvatures.

In the above description of the embodiment, there has been described an example in which the diffraction light pattern includes bright lines extending in the vertical direction. However, it is possible to form a diffraction light pattern including bright lines extending in the horizontal direction. This can be realized by counterchanging the features of the micro lenses between the vertical direction and the horizontal direction. Furthermore, image rotating means may be provided on the object side of a diffraction plate so that one diffraction light pattern having bright lines extending in the vertical direction can be used as vertical and horizontal focus detection patterns in accordance with the directions (i.e. vertical and horizontal directions) of line sensors of an auto focus detection apparatus.

It should be understood that the apparatus according to the embodiment has been described merely by way of example, and the present invention is not limited to its structure and form. Therefore, various modifications and changes can be made within the scope of the invention.

As per the above, according to the present invention, a stripe-like diffraction pattern including multiple bright lines can be generated by using regularly arranged micro lenses having desirable shapes. Therefore, an auxiliary light projection apparatus that can project a focus detection pattern having high contrast to an object to be photographed can be realized.

What is claimed is:

1. An auxiliary light projection apparatus comprising:
   a laser beam device; and
   a diffraction plate for diffracting a laser light from said laser beam device;
   wherein said diffraction plate has micro lenses which are of a same shape in plan view and regularly arranged in vertical and horizontal directions, a curvature of each micro lens in the vertical direction being different from that in the horizontal direction, a pitch of arrangement of the micro lenses in the vertical direction being different from that in the horizontal direction, and maximum heights of the micro lenses being varied cyclically; and
   wherein said auxiliary light projection apparatus projects a diffraction light pattern of said laser light emergent from said diffraction plate to an object to be photographed, as a pattern used for focus detection.

2. An auxiliary light projection apparatus according to claim 1, wherein said focus detection pattern is formed in such a way that said diffraction light pattern includes a pattern that can be regarded as a bright line pattern extending in at least one of the vertical and horizontal directions.

3. An auxiliary light projection apparatus according to claim 1, wherein said shape of said micro lenses is a rectangular shape.

* * * * *